Oct. 14, 1969   R. POUPIN   3,472,358
DEVICE FOR TRANSFERRING ROD-SHAPED OBJECTS SUCH AS CIGARETTES
Filed Sept. 19, 1967   3 Sheets-Sheet 1

INVENTOR
Raymond Poupin
By
Sparrow and Sparrow
ATTORNEYS 3,472,358
DEVICE FOR TRANSFERRING ROD-SHAPED
OBJECTS SUCH AS CIGARETTES
Raymond Poupin, Fleury-les-Aubrais, France, assignor to Service d'Exploitation Industrielle des Tabacs et des Allumettes, Paris, France, a French public establishment
Filed Sept. 19, 1967, Ser. No. 668,815
Claims priority, application France, Sept. 21, 1966, 77,057; June 20, 1967, 111,047
Int. Cl. B65g 15/00, 47/44
U.S. Cl. 198—44   12 Claims

ABSTRACT OF THE DISCLOSURE

A device for supplying one or a number of machines with rod-shaped products such as cigarettes from a conveyor on which the axes of said products are located transversely with respect to the direction of feed of the conveyor, said supply being continuous, irrespective of relative variations in delivery of the feed conveyor and of the machines which are supplied.

---

This invention relates to a device for supplying one or a number of machines with rod-shaped products such as cigarettes from a conveyor on which the axes of said products are located transversely with respect to the direction of feed of the conveyor.

The aim of the present invention is to provide a device whereby the machine or machines can be supplied continuously, irrespective of relative variations in delivery of the feed conveyor and of the machines which are supplied.

Devices of this type have already been proposed in which a reservoir having a variable capacity is included in a supply system for the distribution of cigarettes. In these devices, a mass of cigarettes is taken between conveyor means such as belts which move in substantially parallel planes at relative velocities such that the relative displacement thereof is reduced to a minimum, especially in the case of objects which have cylindrical shapes.

In order to absorb variations to the maximum extent, it is expedient to provide a reservoir having a large capacity which is limited as a rule by space considerations. Moreover, in order to maintain the products in good condition, it is preferable to store them in reservoirs which have both a small height and a length which is as great as possible. To this end, the present invention comprises a reservoir which has a variable capacity and which can preferably be placed above plane of supply of the machines.

In the case of a workshop which is equipped with packing machines placed in line, for example, the reservoir could be placed above said machines along the entire line. Without taking up any space on the ground, the reservoir will thus have a very large capacity which accordingly endows the device with considerable adaptability.

The reservoir in accordance with the invention is essentially intended to receive any quantity of products which exceeds the possibilities of absorption of the machines; said reservoir can advantageously consist of a channel branched off the product stream which is normally directed by the feed conveyor towards the distribution conveyor, any deficiencies in said stream being compensated by a secondary flow derived from the reservoir and discharged to the distribution conveyor at the same point of junction of this latter with the feed conveyor.

The flow path thus obained will accordingly be as short as possible from the supply to the distribution and only those products which arrive during saturation of the distribution are by-passed through the reservoir.

An additional feature of the invention which is primarily intended to simplify the construction of the device consists in causing the products to pass into the reservoir through an inlet which also serves as its outlet at the end of the reservoir.

This invention is also directed to a reservoir which is essentially made up of a moving floor such as a conveyor belt which carries an abutment wall which may be either vertical or slightly inclined to the vertical and capable of sweeping the entire area of the reservoir. Said reservoir could also comprise a travelling ceiling or top wall such as a moving belt. The movements of displacement of these two belts which are controlled by the variations in level can be carried out either by means of a single motor which drives them in a synchronous motion or by means of separate motors which impart different speeds either to or one moving belt or to the other according to the direction of displacement in such a manner as to facilitate the introduction of excess quantities in the storage section or discharge section of the reservoir.

The detection of variations in level will advantageously be carried out above a well which communicates with both conveyors and with the opening of the reservoir. It will thus be possible to avoid any gaps in the mass of cigarettes which might develop between the normal stream and objects placed in reserve as a result of variations in the different flow rates.

A further advantage of the device which raises from the basic design of this latter is that it permits of double utilization by virtue of a symmetrical construction of the complete assembly, except for the moving wall, with respect to the transverse axis of the reservoir.

As a consequence, the reservoir can be supplied either at one end or the other with different objects which must be packed, for example, by the same machines.

The variable-capacity reservoir in accordance with the invention is mounted as a by-pass in order to absorb variations in output of the machines located either upstream or downstream but does not play any part in the case of equilibrium of the respective output rates in which the objects pass directly via the well from the feed conveyor to the distribution conveyor. It is thus possible to obtain a mass transport in which the objects remain in a state of sufficient relative cohesion and thus flow in a homogeneous stream along a passageway which has a substantially uniform cross-sectional area, thereby achieving particularly favourable conditions.

A further aim of the invention is to maintain the conditions of cohesion of the masses of moving rod-shaped objects, not only when equilibrium between the flow rates is established but also when it is upset. When the relative flow rates are at equilibrium, the objects move in a single stream. As soon as this equilibrium is upset, the stream is divided if the downstream flow rate is lower than the upstream flow rate, whereas the streams recombine if the converse takes place. In the first case, the upstream flow splits up into two parts of variable volume, one part being directed towards the distribution conveyor as and when objects are admitted whilst the other part of the flow is directed towards the variable-capacity reservoir. In the second case, the insufficient upstream flow is increased by the make-up stream which is derived from the reservoir.

As a result of the divergent and convergent flow motions referred to, cavities are liable to form in the mass of objects and to cause the oblique displacement of these latter. It is further apparent that, by modifying the directions of the flowing streams, the mass of objects can be subjected to compressions which may be detrimental both to the objects themselves if they are delicate products such as cigarettes and to the operation of the machine owing to the attendant danger of clogging.

The problem to be solved consisted in effecting separations in the mass of objects without compressing these latter and by combining their natural vertical motion downwards into the reservoir with the motion of the conveyor-belt of the reservoir base either towards the well or, in the opposite direction.

To this end, it is a further object of the invention to ensure that the wall which serves to guide objects into the well and which is located opposite to the reservoir opening has an orientation such that the angle which is made with the horizontal plane by said wall is only slightly larger than the angle of fall of the products. By this means, any reduction in the downstream flow is no longer liable to cause either cavity formation in the mass of objects or undesirable packing of objects against said wall.

Another object of the invention lies in the fact that said wall constitutes the lower section of a bow-shaped projection which is directed towards the reservoir opening, the upper section of said bow-shaped projection being preferably inclined to the horizontal at an angle having a value which is at least equal to that of the angle of friction of objects against the wall in such a manner as to assist the natural downward motion of the objects along said wall and within the inlet zone of the well. A bow-shaped projection of this type having a rounded nose is wholly suited to the function of flow splitter in the event of insufficiency of the upstream flow with respect to the downstream flow. In fact, the objects which are conveyed by the reservoir-base conveyor belt towards the well for the purpose of compensating for this insufficiency are directed by said flow splitter partly downwards for the purpose of maintaining the downstream flow rate at the necessary level and partly upwards in order to compensate for the naturally excessive downward motion of objects and to maintain the supply at the top of the well at which the cohesion of the objects must be retained.

Splitting of the streams will be carried out in a particularly satisfactory manner by placing the nose of the flow splitter opposite to the top zone of the opening which provides a communication between the reservoir and the well.

In order to ensure careful handling of objects during filling of the reservoir, that is to say when the upstream flow rate is higher than the downstream flow rate, and in order to prevent the objects from being pushed against each other in order to fill the reservoir as would actually be the case if said objects were transferred into the well inlet in a substantially horizontal plane, an additional object of the invention accordingly consists in placing the top level of the lateral opening of the well below the downstream end of the feed conveyor.

Another and final object of the invention consists in placing at the top of the reservoir opening a roller having a double direction of rotation and defining with the reservoir-base conveyor belt guide roller which also has two-directional rotation an acute angle which is substantially larger than the fall angle. It is possible in this manner to reduce the width of the top portion of the well or—which amounts to the same thing in order to prevent the objects from exerting horizontal thrusts on each other—to reduce the height of the well inlet between the feed conveyor and the upper level of the reservoir inlet.

Further properties and advantages of the invention will become apparent from the following description of non-limitative examples of construction of devices according to the invention, reference being made to the accompanying drawings, in which.

Figure 1:
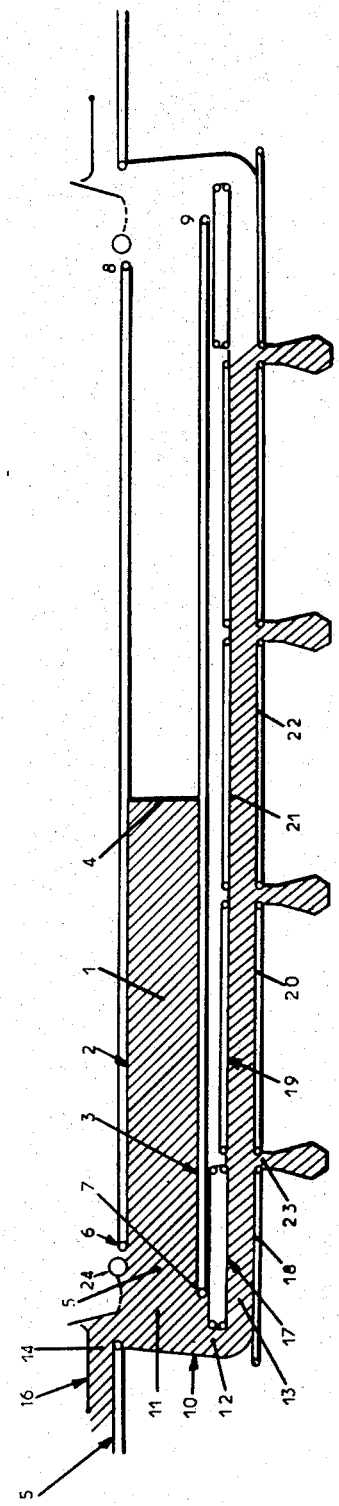
FIG. 1 is a general diagrammatic longitudinal sectional view of the device according to the invention.

In the example shown in FIG. 1, the device comprises a variable-capacity reservoir 1 which is formed by the belts 2 and 3 and by the partition wall 4 which is attached to said belts. The shaded portions represent masses of cigarettes. The partition wall 4 is intended to move from the opening 5 between the rollers 6 and 7 to the other extremity which is delimited by the end wall of the reservoir between the rollers 8 and 9.

An equalization device comprising the rotating roller 24 serves to level off the stream of cigarettes which is diverted into the reservoir in order to prevent the stored cigarettes from being compressed between the belts 2 and 3.

At a point located opposite to the opening 5, the plate 10 forms one side of the well 11 which communicates with the inlet 12 of the distribution conveyor 13 and the outlet 14 of the feed conveyor 15. A detection pallet 16 is placed above the conveyor 15 and the well 11.

The inlet 12 is delimited by the wall 10 and the extremity of the belt 17 which constitutes a portion of the base of the well 11. The distribution conveyor 13 is constituted successively by the duct which is formed by the belts 17 and 18 (said belt 18 also constitutes a portion of the base of the well 11), the belts 19 and 20, 21 and 22 and so forth in sequence. The outlets 23 of the conveyor 13 are formed by the space which is provided between the belts 18 and 20, 20 and 22 and so on.

When all the machines which are coupled to this device are operating normally, the output of the feed conveyor 15 is usually equal to the output of the distribution conveyor 13. Under these conditions, the level of cigarettes inside the well 11 is stabilized at a value such that the detection pallet 16 remains within a neutral zone which corresponds to the stationary state of the belts 2 and 3; the stream of cigarettes which is carried by the conveyor 15 passes vertically through the well 11 and flows in through the inlet 12 of the distribution conveyor 13.

When the outputs of the conveyors 15 and 13 are no longer similar, the level of cigarettes within the well 11 varies (the level rises when the feed conveyor 15 delivers a greater number of cigarettes than the distribution conveyor 13 and falls in the contrary case), and these variations are detected by the pallet 16. Starting from predetermined thresholds, the pallet 16 initiates the operation of the travelling bands 2 and 3 in the appropriate direction in order to restore the level of cigarettes within the well 11 to its set value. When this last-mentioned operation has been completed, the pallet 16 initiates the stopping of the travelling bands 2 and 3.

During the operation of the device, the belts which constitute the distribution conveyor 13 move at speeds which are respectively proportional to the number of machines which they are intended to supply.

As is readily apparent, it is possible to supply the feed conveyor 15 by means of an "elevator" device so that the upstream machines can be placed without any difficulty on the same plane as or even on a lower plane than the machines to be supplied which are located downstream.

Figure 2:
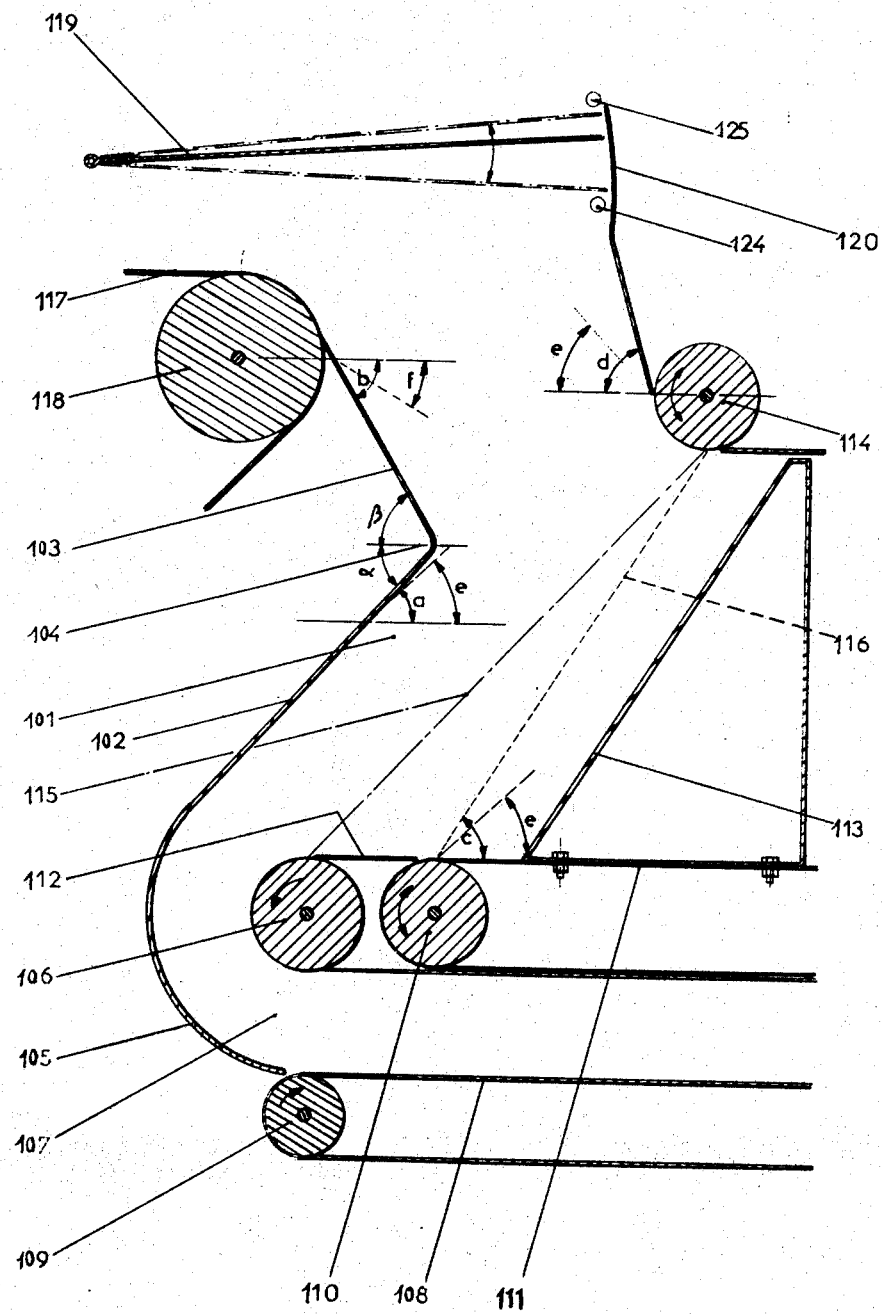
FIG. 2 is an enlarged view of one end of an alternative form of the device according to FIG. 1.

As shown on the right-hand side of FIG. 2, it is possible to construct a device which is symmetrical with that which was previously described, so that other machines located upstream could also supply the same downstream machines in an opposite direction. It is possible by this means to transfer two different productions in succession to a same group of packing machines.

The adaptability of the device can be further enhanced by providing a well together with its different openings in accordance with the invention on each side of the device in order to communicate with either one or the other of two superposed reservoirs whose inlets and outlets are located at opposite extremities. In this manner, the downstream machines can be utilized in combination for different productions by dividing them between these latter according to requirements.

Figure 3:
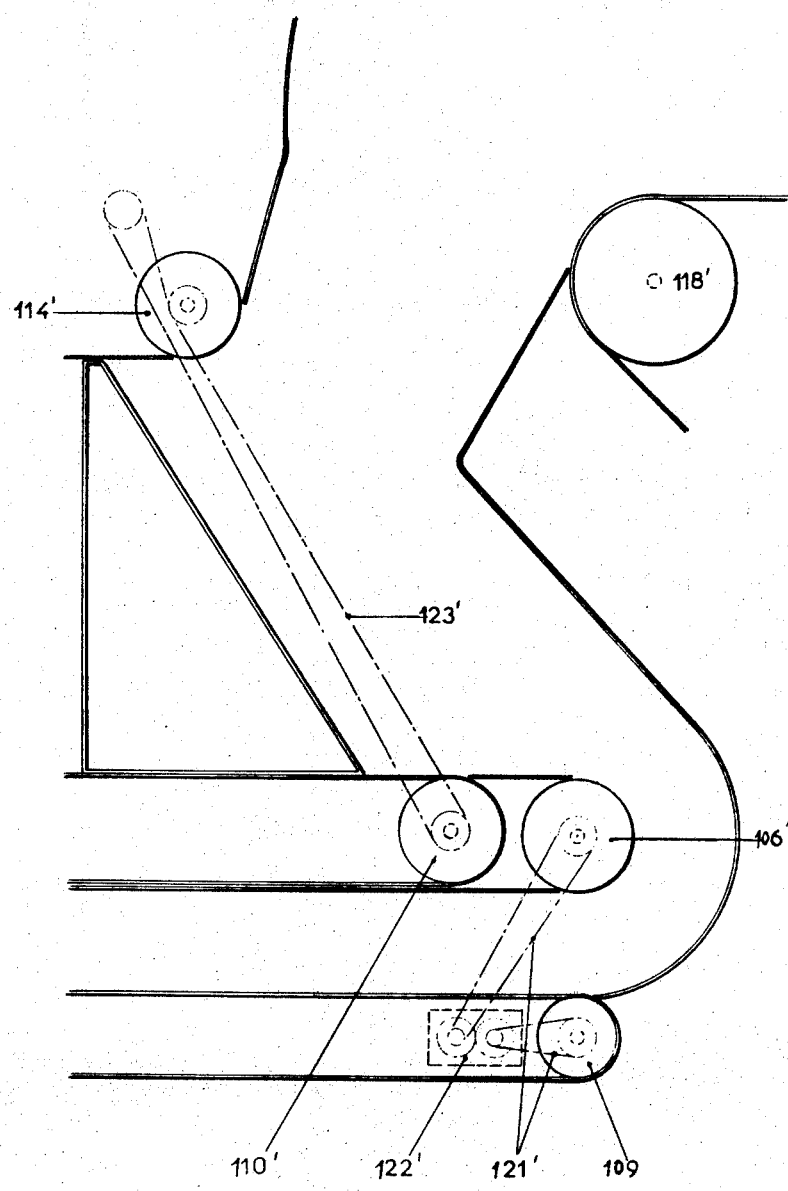
FIG. 3 is a view which is similar to FIG. 2 but looking on the opposite side of the device.

In the example of construction of FIGS. 2 and 3, the well 101 is delimited on one side by the walls 102 and 103 which form the nose 104 of the bow-shaped projection at their point of junction. An angle $a$ is made with the horizontal by the guide wall 102 and is only slightly larger than the fall angle $e$ of the cigarettes. The angle $b$ made with the horizontal by the guide wall 103 is very substantially larger than the angle of friction $f$. The wall 102 extends downwards in the form of a shell 105. In conjunction with the roller 106 which rotates in the direction of the arrow downstream machines are supplied, said shell forms a duct 107 having a height equal to the thickness of the layer which is transported by the distribution conveyor 108. The roller 109 is the guide roller of the distribution-conveyor belt. The guide roller 110 of the base conveyor belt 111 is disposed in very close proximity to the roller 106. The bridge 112 effects the junction between these two rollers. The belt 111 carries the plate 113. The roller 114 which has two directions of rotation delimits at the top the lateral opening of the well which is represented by the chain-dotted line 115. The opening defined by the broken line 116 which joins the roller 114 to the roller 110 makes with the horizontal an acute angle $c$ which is substantially larger than the fall angle $e$.

The feed conveyor 117 comprises a guide roller 118 which is joined to the wall 103. The roller 114 is in a horizontal plane located between the plane of the conveyor 117 and the horizontal plane which passes through the nose of the bow-shaped projection. The detection pallet 119 closes off the top of the well. The partition wall 120 which is located opposite to the conveyor 117 makes the horizontal an angle $d$ which is substantially larger than the fall angle $e$.

The chain 123' drives the roller 114' from the guide roller 110' of the base conveyor belt 111'.

Similarly, two chains 121' and a device 122' for reversing the direction of rotation drive the roller 106' from the guide roller 109' of the distribution conveyor 108.

The rollers 110' and 114' on the one hand and 109' and 106' on the other hand therefore rotate simultaneously but their respective directions of rotation are opposite.

The devices of FIGS. 2 and 3 operate in a manner which is similar to the device of FIG. 1, namely:

When all the machines which are coupled to the apparatus are in normal production, the output of the feed conveyor 117 is usually equal to the output of the distribution conveyor 108. Under these conditions, the level of objects inside the well 101 is stabilized at a value such that the detection pallet 119 remains within a neutral zone which corresponds to the stationary state of the base conveyor belt 111 and of the roller 114. The stream of objects transferred by the conveyor 117 passes through the well 101, then through the duct which is defined by the shell 105 and the roller 106 and flows through the inlet of the distribution conveyor 108.

When the rates of delivery of the conveyors 117 and 108 are no longer similar, the level of objects contained in the well 101 varies (the level rises when the conveyor 117 delivers a greater number of objects than the con-conveyor 108 and falls when the converse applies), and these variations are detected by the pallet 119.

Starting from thresholds defined by two photoelectric cells 124 and 125, the pallet 119 initiates the operation of the base conveyor belt 111 in the desired direction in order to restore the level of objects inside the well 101 to its set value.

When the conveyor 117 delivers a greater number of objects than the conveyor 108, the photoelectric cell 125 initiates the operation of the base conveyor belt 111 in order to increase the value of the reverse. Under these conditions, the stream of objects carried by the conveyor 117 is split up into two parts:

One part flows through the well 101 towards the inlet of the conveyor 108;

The other part is directed towards the reservoir through the lateral opening 115 of the well 101.

The correct introduction of the objects last referred to up to the full height of the reservoir entails a relative arrangement of the rollers 110 and 114 such that the opening which they define makes a predetermined angle $c$ with the horizontal.

The cohesion of the objects in the inlet zone of the reservoir is ensured only under the action of gravity, so that the above-mentioned angle $c$ should be smaller than the fall angle $e$. However, taking into account the thrust exerted on the objects placed at the inlet of the reservoir by the objects located above the reservoir, said angle $c$ can be substantially increased even to a point beyond the value of the angle $e$. This increase can be correspondingly greater as the difference in level between the downstream extremity of the feed conveyor 117 and the roller 114 is greater. Widening of the angle $c$ has the effect of bringing the roller 114 closer to the wall 103, which is particularly advantageous inasmuch as the mass of objects to be pushed towards the wall 120 is thus reduced in volume and the stresses to which said objects are subjected are correspondingly reduced.

On the contrary, when the conveyor 117 delivers at a lower rate than the conveyor 108, the photoelectric cell 124 actuates the base conveyor belt 111 so as to reduce the value of the reserve. Objects derived from the reservoir are then added to the stream of objects introduced by the conveyor 117 in order to maintain the mean flow rate at the inlets of the well equal to the discharge rate.

A particular condition of operation is achieved when the delivery of the conveyor 117 becomes relatively low or zero. In this case, practically the entire quantity (or the whole quantity) of objects discharged by the distribution conveyor 108 is supplied from the reservoir, with the result that the flow of objects within the well 101 is modified to an appreciable extent.

In fact, under the action of gravity, objects which are located in the top portion of the well flow progressively towards the lower portions. Since the rate of flow of objects introduced by the conveyor 117 is insufficient to compensate for this natural downward motion, the bow-shaped projection 104 performs the function of flow-splitter and its top portion 103 diverts towards the top of the well a part of the objects derived from the reservoir in order to prevent the formation of cavities beneath the pallet 119.

The bow-shaped projection 104 is correspondingly more effective as the angles $\alpha$ and $\beta$ are smaller. However, when the inflow rate remains higher than or equal to the outflow rate, the displacement of objects inside the well takes place solely under the action of gravity. Under these conditions, the angle $\alpha$ which is equal to $a$ must not be smaller than the fall angle $e$ in order to prevent the formation of cavities beneath the wall 102 as such cavities would permit oblique or transverse displacement of objects located at the top of the duct and the angle $\beta$, which is equal to $b$, must remain larger than the angle of friction $f$ so as to permit the objects to flow correctly against the wall 103.

Said angle $\beta$ will preferably be substantially larger than the angle of friction in order to reduce the distance between the wall 103 and the roller 114 solely to the extent permitted by the bow-shaped projection.

Certain objects, such as cigarettes, may have a diameter varying along their length or additional thicknesses, which might tend to disturb the device. In these cases, it has been found that it could be advantageous to give to some parts of the walls delimiting the passage towards the distribution means an inclination intended to take into account said additional thicknesses or variations of diameter.

What I claim is:

1. A device for supplying at least one machine with rod-shaped objects comprising at least one feed conveyor, distribution means to the machine, a passageway establishing a direct communication between said feed conveyor and said distribution means, at least one variable capacity reservoir mounted as a by-pass off said passageway, and said communication passageway being consituted by a well provided at the top portion thereof with an inlet into which the feed conveyor discharges, at the bottom portion thereof with an outlet which communicates with the distribution means, and laterally thereof on one side with a stationary guide wall which extends between said inlet and outlet and on the other side with a lateral opening which corresponds to the end opening of the reservoir, and the angle made with the horizontal by at least both the lower part of the guide wall and by said lateral opening being only slightly larger than the fall angle of the mass of objects.

2. A device in accordance with claim 1, wherein the guide wall is a bow-shaped projection the point of which is directed towards the reservoir.

3. A device in accordance with claim 2, wherein the point of the bow-shaped projection is located below the top level of the end opening of the reservoir and in the upper zone of the said opening.

4. A device in accordance with claim 1, wherein the angle made with the horizontal by the upper portion of the bow-shaped projection is an acute angle having a value at least equal to that of the angle of friction of the objects one against the other.

5. A device in accordance with claim 1, wherein the upper level of the side opening of the well is located below the downstream end of the feed conveyor.

6. A device in accordance with claim 1, wherein said lateral opening of said well is delimited at the top by a roller having two directions of rotation.

7. A device in accordance with claim 1, wherein means for the positive transfer of objects towards the distribution are provided within the zone of junction between said reservoir and said distribution means.

8. A device in accordance with claim 1, wherein said lateral opening of said well is delimited at the bottom by a rotating roller which is adapted to rotate in the direction of flow of the objects.

9. A device in accordance with claim 8, wherein said reservoir is delimited at least at the bottom by an endless belt having at least one guide roller with two directions of rotation and said bottom rotating roller is located in proximity to said endless belt guide roller, and wherein a junction bridge is provided between said rollers.

10. A device in accordance with claim 9, wherein the angle made with the horizontal by the plane which contains the axes of said guide roller with two directions of rotation is an acute angle which is substantially larger than the fall angle of the mass of objects.

11. A device in accordance with claim 1, wherein the variation of capacity of the reservoir is controlled by a level-detecting pallet bearing on the objects fed by the feed conveyor and which extends above the inlet of the well and provision is made opposite to said conveyor for a stationary wall which forms an upward extension of said lateral opening of said well, the acute angle made with the horizontal by said wall being at least equal to the fall angle of the mass of objects.

12. In a device for supplying at least one machine with rod-shaped objects of the type comprising at least one feed conveyor, at least one variable capacity reservoir and distribution means to the machine, a passageway establishing a direct communication between said feed conveyor and said distribution means, said reservoir being mounted as a by-pass off said passageway, said distribution means comprising a plurality of upper endless belts and parallel lower endless belts, the bottom runs of the upper belts and the top runs of the lower belts being adapted to delimit a duct of substantially constant cross-sectional area, spaces being provided between successive lower belts to afford communication towards the machine.

References Cited

UNITED STATES PATENTS 3,355,004    11/1967    Rupert _____ 198—44

FOREIGN PATENTS 1,062,487    6/1965    Great Britain.

RICHARD E. AEGERTER, Primary Examiner

U.S. Cl. X.R.

198—165